United States Patent [19]

Mamontov et al.

[11] Patent Number: 5,039,946

[45] Date of Patent: Aug. 13, 1991

[54] METALLIFEROUS OBJECTS DETECTOR HAVING A PAIR OF ANGULARLY POSITIONED DRIVING LOOPS AND A PAIR OF PARALLEL, COAXIAL RECEIVING LOOPS

[75] Inventors: Jury M. Mamontov; Vladimir J. Danilov; Boris A. Trukhlin, all of Moscow, U.S.S.R.

[73] Assignee: Inzhenerny Tsentr Vnii po Stroitelstvu Magistralnykh Truboprovodov, U.S.S.R.

[21] Appl. No.: 484,428

[22] Filed: Feb. 23, 1990

[51] Int. Cl.⁵ .................... G01V 3/11; G01V 3/165
[52] U.S. Cl. ...................................... 324/329; 324/67
[58] Field of Search ........................ 324/326–329, 324/67, 225, 232, 239, 243

[56] References Cited

U.S. PATENT DOCUMENTS 4,091,322 5/1978 Stankoff .............................. 324/329
4,255,710 3/1981 Weber ................................. 324/328

FOREIGN PATENT DOCUMENTS 1190330 11/1985 U.S.S.R. .
2004069 3/1979 United Kingdom ................ 324/329

OTHER PUBLICATIONS

Induktsionnye Kabeleiskateli, Svyaz Publishers, Moscow, 1970, pp. 75–78.
Labor Saving M-Scope Model TW-5, brochure from "The Grigsby Company, Inc.", 7-1-81.

*Primary Examiner*—Gerard R. Strecker
*Attorney, Agent, or Firm*—Ladas & Parry

[57] ABSTRACT

The detector of the invention comprises two driving loops mounted at an angle to one another and rigidly tied to receiving loops connected to a balancer, differential amplifier and to the data inputs of electric signal compensators. The detector is equipped with a switch, providing alternate connection of a generator to one driving loop and to the control input of one compensator and the output thereof to the input of an amplifier, and then to the other driving loop and to the control input of the other compensator and its output to the input of the other amplifier. The amplifiers are connected to data processors, recorders, an OR gate, and a signalling unit.

4 Claims, 4 Drawing Sheets

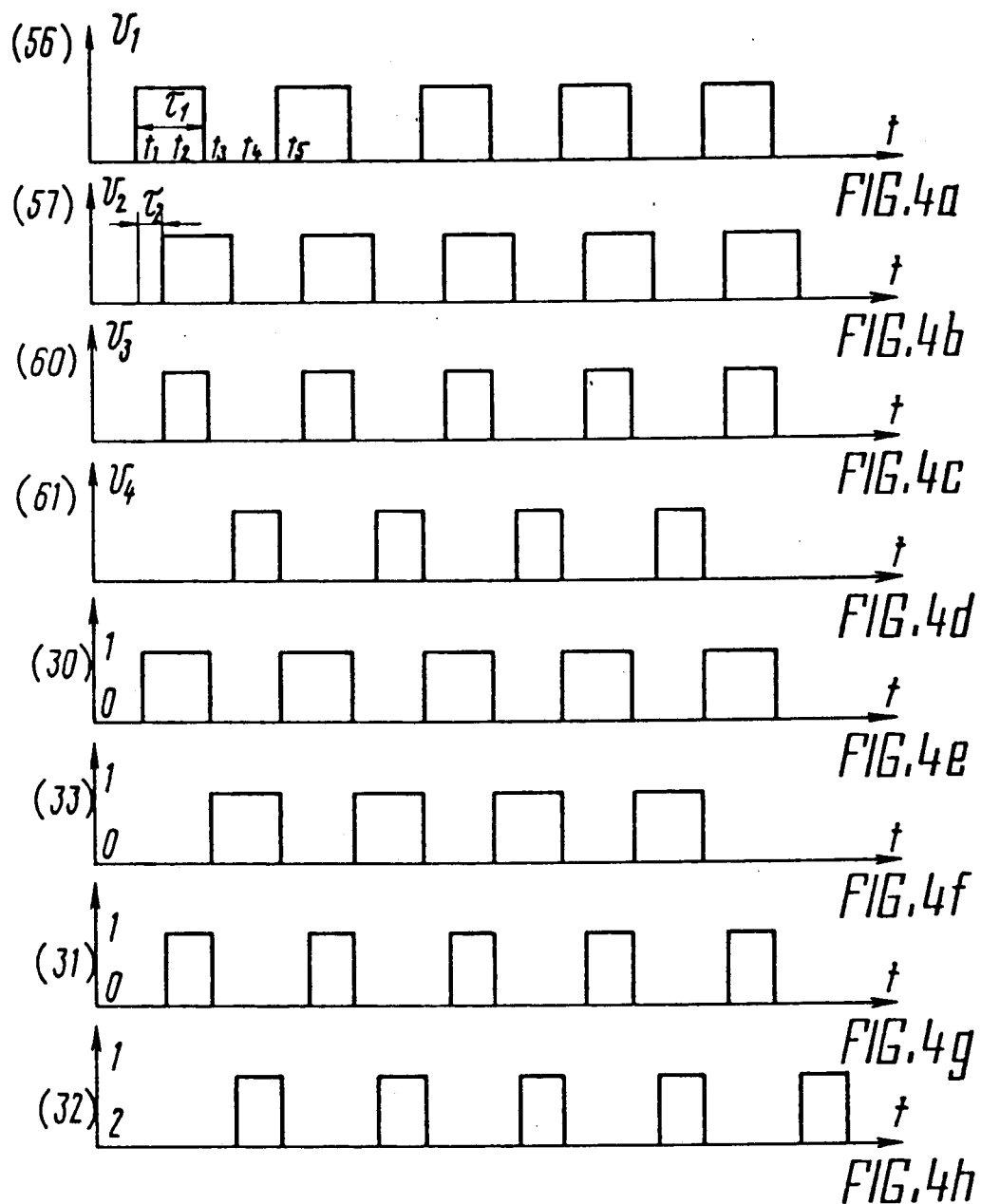

METALLIFEROUS OBJECTS DETECTOR HAVING A PAIR OF ANGULARLY POSITIONED DRIVING LOOPS AND A PAIR OF PARALLEL, COAXIAL RECEIVING LOOPS

FIELD OF THE INVENTION

The invention relates to the area of detecting metalliferous objects with the aid of electromagnetic fields, and more specifically to detectors of metalliferous objects.

The invention can be widely used in diverse branches of industry and national economy, such, for instance, as civil engineering, geodesy, agriculture, maintenance of engineering structures, archeology, geology, etc. to detect a locality or an installation of both mapped and unmapped metalliferous utility systems and objects, such as pipelines, electric cables, geodetic bench marks, reinforced concrete plates, buried well covers, and other metalliferous objects, including those with non-ferrous metals.

The invention can also be used in wood working, food and other industries and in agriculture to track buried electric distribution networks in buildings and structures, and also metal inclusions in raw materials and fodder.

BACKGROUND OF THE INVENTION

Currently, the problem of searching for unmapped metalliferous objects, including objects with nonferrous metals, has become most urgent. One approach to solving this problem is the use of compact inductive devices combining the functions of radiating an original electromagnetic field and reception of a secondary electromagnetic field induced by the metalliferous object positioned within the range of the original electromagnetic field.

Known in the art are detectors of buried metalliferous objects (high-frequency FM 480 finder from Seba Dynatronic, FRG, and pipeline and wire finder TW=5 from Grigsby Co., USA), of similar design and each comprising: a generator loaded onto a driving loop, a receiving loop orthogonal to the driving loop and loaded by connected in series selective amplifier, data processor and acoustic signalling device. The detector is also equipped with a geometric means to cancel the signal induced by the original electromagnetic field of the driving loop in the receiving loop.

These detectors function by radiating an original electromagnetic field from the driving loop into the area under study and picking up a secondary electromagnetic field induced by the metalliferous object.

These detectors are highly sensitive to external electromagnetic fields and to interference from utility systems located in the vicinity of the search site, because they also radiate a secondary electromagnetic field under the effect of the original electromagnetic field of the driving loop.

Furthermore, the reliability of detecting utility systems positioned at angles less than 20° relative to the direction of receiving loop movement is rather low, due to the low level of signal induced by the driving loop in the utility system.

Also widely known in the art are metalliferous objects detectors (V. F. Bakhmutsky, G. I. Zuenko "Induktsyonnye kabeleiskateli" (Induction Wire-Finders), 1970, Moscow, Svyaz Publishers, pp. 75–78, FIGS. 31–32. In Russian), each comprising a driving loop and two receiving loops rigidly tied to it, orthogonally positioned and differentially connected, located symmetrically to both sides of the driving loop. In one case the driving loop is positioned vertically and the receiving loops are horizontal, in another case loop orientations are reversed. The electric signal recording circuitry in bothcases are identical and similar to that described herein above.

It should be noted, that the direction of detector movement coincides with that of the rod carrying the receiving loops.

Such detectors are prone to interference from external electromagnetic fields and metalliferous objects in the vicinity of the search site. This is due to the considerable spacing between the receiving loops, necessary to ensure an adequate sensitivity and adequate degree of geometric cancelling. However, at a large spacing between receiving loops and at utility systems positioned at an angle less than 20° relative to the direction of detector movement, the detection reliability is poor because of the low intensity of the secondary electromagnetic field from the utility system at vertical receiving loops or low signal induced in the utility system at horizontal receiving loops.

It should be noted, that due to the poor interference immunity of the herein above cited detectors, they cannot be used when mounted on transportation means, which would itself be a source of interference, so that searches have to be performed manually, this impairing productivity.

The metalliferous objects detector (SU, A, 1190330) features a higher productivity and higher immunity to external electromagnetic fields and comprises a driving loop rigidly tied to two receiving loops positioned coaxially and in parallel to one another and symmetrically and orthogonally relative to the driving loop positioned in the plane of the common axis of the receiving loops, an AC voltage generator electrically connected to the driving loop, and connected in series balancer to provide balancing of the signals from the receiving loops and with inputs connected to the receiving loops, and differential amplifier with the output thereof connected to the data input of an electric signal compensator intended to cancel the effect of the original electromagnetic field of the driving loop on the receiving loops and having a control input connected to the AC voltage generator and with the output thereof driving the input of a selective amplifier, the output whereof is connected to the input of a data processor with the output thereof connected to a recorder and electrically coupled to a signalling unit.

The mutual arrangement of the driving and receiving loops herein above described provided a substantial improvement in the detector's interference because external electromagnetic fields (from power distribution lines, electrified railways, communications lines, etc.) induce practically identical signal levels in both receiving loops, and these signals are mutually cancelled out due to their opposite connection.

However, a metalliferous object (utility system) positioned at an angle less than 20° relative to the search direction, which is normal to the rod carrying the receiving loops, the detection reliability is poor due to the low intensity of the electromagnetic field induced by the driving loop in the metalliferous object.

To improve the detection probability when searching for utility systems one and the same ground has to be covered twice, at different orientation of the induction system relative to the direction of movement. However, even this does not ensure adequate detection probability because it is difficult to maintain the same search direction when moving in the opposite direction and this is true of both manual and mechanized searching.

SUMMARY OF THE INVENTION

It is an objective of this invention to provide a metalliferous objects detector with a high reliability of metalliferous objects detection.

Another object of the invention is to provide a higher search productivity.

The objects of the invention are attained in a metalliferous objects detector, wherein two identical driving loops are positioned at an angle to one another and rigidly tied to receiving loops mounted coaxially and in parallel to one another. Relative to the receiving loops the driving loops are positioned symmetrically and orthogonally in planes passing through the common axis of the receiving loops. The receiving loops are connected in series with a signal balancer to balance the signals from the receiving loops and the differential amplifier. The output thereof is connected to the data inputs of the first electric signal compensator and of the second electric signal compensator, the control inputs of the electrical signal compensators and the driving loops being connected to two outputs of a switch. The two other outputs of the switch are connected to the inputs of two selective amplifier and the inputs thereof are connected to an AC voltage generator and to the outputs of the first and second electric signal compensators. The switch alternately connects the AC voltage generator at first to the first driving loop and to the control input of the first electric signal compensator, and the output thereof, to the input of the first selective amplifier, and then, to the second driving loop and to the control input of the second electric signal compensator, and the output thereof to the input of the second selective amplifier. The outputs of the selective amplifiers are connected to the inputs of two data processors, the outputs thereof are connected to recorders and to the inputs of the logic OR gate, the output thereof being connected to a signaling unit.

Advantageously, the angle between the driving loops is within the range from 60° to 120°.

It is expedient that the switch comprises one normally open and three normally closed keys and a switch controller to control changing the states of those keys and connected to their control inputs.

It is useful that the switch controller comprise a rectangular pulse generator, the output signals whereof are applied to the control inputs of the first normally closed key and normally open key, a time delay circuit, two inverters, and two logic AND gates.

The input of the time delay circuit, the first input of the first logic AND gate and the input of the first inverter connected to the output of the rectangular pulse generator, the second input of the first logic AND gate and the input of the second inverter connected to the output of the time delay circuit and the inputs of the second logic AND gate connected to the inverter outputs wherein the outputs of the logic AND gates constitute the outputs of the switch controller connected to the control inputs of the second and third normally closed keys.

This design configuration of the metalliferous objects detector provides a higher reliability of metalliferous object detection, irrespective of the object orientation relative to the direction of search.

Furthermore, search productivity is improved at least twofold due to the search site (building) being scanned during a single pass.

BRIEF DESCRIPTION OF ACCOMPANYING DRAWINGS

These and other objectives of the invention will become apparent from the following description of the invention with reference to specific embodiments thereof and to the accompanying drawings, wherein.

FIGS. 4$a$-4$h$ show the timing diagrams illustrating functioning of the switch.

DETAILED DESCRIPTION

Figure 1:
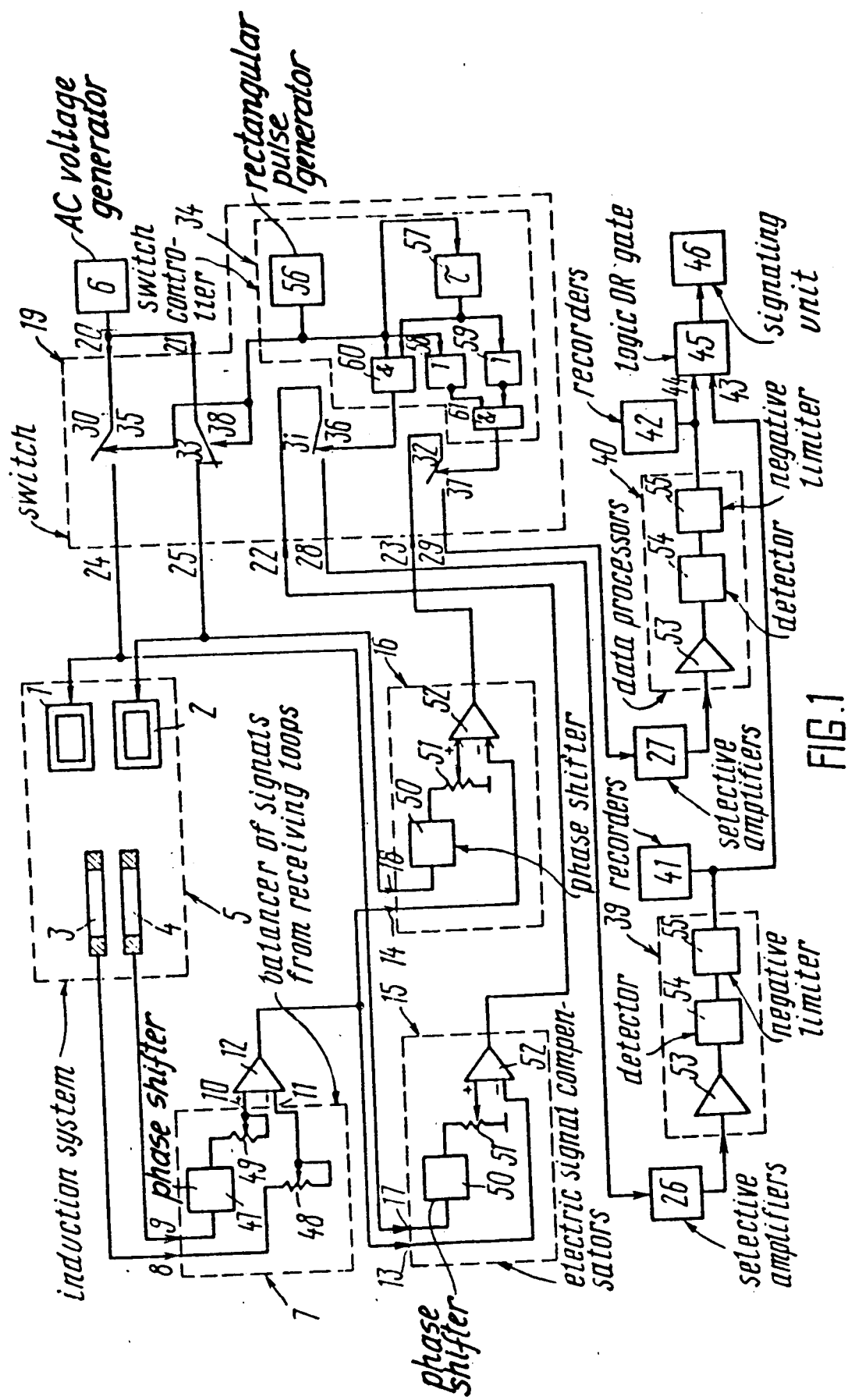
FIG. 1 shows the functional diagram of the metalliferous objects detector, according to the invention.

The metalliferous objects detector comprises two driving loops 1,2 (FIG. 1) and two receiving loops 3,4 constituting an integrated induction system 5, AC voltage generator 6 and signal balancer 7 providing balancing of signals from receiving loops 3,4 with inputs 8,9 thereof connected to receiving loops 3,4. Signal balancer 7 equalizes the signals from receiving loops 3,4 induced in induction system 5 by external interfering electromagnetic fields and due to non-identity of receiving loops 3,4 electromagnetic parameters.

Outputs 10, 11 of balancer 7 drive differential amplifier 12, the output whereof is connected to the data inputs 13, 14 of electric signal compensators 15, 16 providing cancelling of electric signals induced in receiving loops 3,4 by the original fields of driving loops 1,2, respectively.

To provide connection in turn to AC voltage generator of driving loops 1,2 and control inputs 17, 18 of electric signal compensators 15, 16 the detector of the invention is equipped with switch 19 with inputs 20, 21 thereof connected to AC voltage generator 6 and with inputs 22, 23 thereof connected to the outputs of compensators 15, 16. Outputs 24, 25 of switch 19 are connected to driving loops 1,2 and control inputs 17, 18 of compensators 15,16, respectively.

The metalliferous objects detector of this invention further comprises two selective amplifiers 26, 27 driven from outputs 28, 29 of switch 19 providing connection of compensators 15,16 outputs to the inputs of selective amplifiers 26,27 according to the connection of AC voltage generator 6 to driving loops 1 or 2 and to control inputs 17 or 18 of compensators 15, 16.

In this embodiment switch 19 comprises three normally closed keys 30, 31, 32, one normally open key 33, and switch controller 34 connected to control inputs 35, 36, 37 of keys 30, 31, 32, respectively. Inputs and outputs of keys 30, 33 constitute inputs 20, 21 and outputs 24, 25 of switch 19, respectively, and the inputs and outputs of keys 31, 32 serve as inputs 22, 23 and outputs 28, 29, respectively, of switch 19.

The metalliferous objects detector of the invention yet further comprises two data processors 39,40 connected to the outputs of selective amplifiers 26,27, and two recorders 41, 42 connected to the outputs of data processors 39,40 also connected to the inputs 43,44 of logic OR gate 45, the output whereof is connected to signalling unit 46.

Balancer 7 may be designed with any known in the art circuit arrangement and in this embodiment comprises phase shifter 47 with the input thereof constituting input 9 of balancer 7, potentiometer 48 connected to input 8 and output 11 of balancer 7, and potentiometer 49 connected to the output of phase shifter 47 and to output 10 of balancer 7.

Compensators 15, 16 are identical in design and each comprises phase shifter 50 with the input thereof constituting control inputs 17 or 18 of compensators 15 or 16, respectively, potentiometer 51 connected to the output of phase shifter 50, and differential amplifier 52 with one input thereof connected to potentiometer 51 and with the other input thereof constituting data input 13 or 14 of compensator 15 or 16, respectively, and output of the differential amplifier 52 constitutes output of the compensator 15 or 16.

Selective amplifiers 26, 27 provide amplification at the operating frequency of AC voltage generator 6.

Data processors 39, 40 are designed with any known in the art circuit configuration and in this embodiment each comprise in series connection a logarithmic amplifier 53 providing an expanded range of detectable object sizes without sensitivity adjustments during searches, detector 54 and negative limiter 55 providing detuning from constant effects (equipment noise, vibrations, etc.).

Analogue or digital meters (voltmeters) may serve as recoders 41, 42.

The signalling unit 46 may be made on the basis of sound source and indicator lamp according to any known in the art circuit configuration and performs sound and light signalization indicating detection of metalliferous objects.

In this embodiment switch controller 34 comprises rectangular pulse generator 56 connected to control inputs 35, 38 of keys 30, 33, time delay circuit 57 with the input thereof connected to rectangular pulse generator 56, and two inverters 58, 59 with the input of the first thereof connected to rectangular pulse generator 56 and with the input of the second thereof connected to the output of time delay circuit 57. Controller 34 further comprises two logic AND gates 60, 61 with the inputs of the first thereof connected to rectangular pulse generator 56 and to the output of time delay circuit 57 and with the inputs of the second thereof connected to the outputs of inverters 58, 59. The outputs of logic AND gates 60, 61 are connected to the control inputs of keys 31, 32.

In this embodiment rectangular pulse generator 56 operates at a duty factor of 0.5 (i.e. is a squarewave generator) providing driving loops 1,2 being connected to AC voltage generator 6 for equal time intervals. The repetition rate of rectangular pulse generator 56 operation is set to 0.1 f, where f is the operating frequency of AC voltage generator 6. Under these conditions the metalliferous objects detector is capable of detecting signals induced by the secondary electromagnetic field generated by a metalliferous object.

Receiving loops 3,4 of integrated induction system 5 are identical in design and are positioned in coaxial and parallel arrangement relative to one another, with driving loops 1,2 positioned orthogonally and symmetrically relative to receiving loops 3,4 in planes passing through common axis 62 (FIG. 2) of receiving loops 3,4 and at an angle α relative to one another within the range from 60° to 120°.

Driving loops 1,2 and receiving loops 3,4 are mechanically interlinked by rods 63, 64 to constitute a rigid structure.

A high reliability of metalliferous object detection is ensured at any angle α within the range cited (60° to 120°) because angle β between the metalliferous object (utility system) and tie rod 63 connecting one of the driving loops 1,2 (in this embodiment—loop 2) to tie rod 64 is always less than 60°, thus ensuring a sufficiently high level of the signal induced in the metalliferous object.

The design arrangement described herein above provides mutual positioning of driving loops 1,2 and receiving loops 3,4, wherein electromagnetic coupling between them is minimized. The spacing L between driving and receiving loops is selected from the viewpoint of induction system 5 stability as determined by a constant degree of geometric cancelling of the original electromagnetic field (which depends on the spacing between driving and receiving loops) and by a constant mutual positioning of driving and receiving loops. As is well known, all other conditions being equal, the degree of geometric cancelling is increased at higher L values whereas the stability increases at smaller spacings L. Therefore, depending on the specific application area (portable or mounted on a vehicle) and on structural considerations (materials used, production engineering) spacing L is selected in each case individually so as to provide the specified stability and degree of geometric cancelling.

Figure 2:
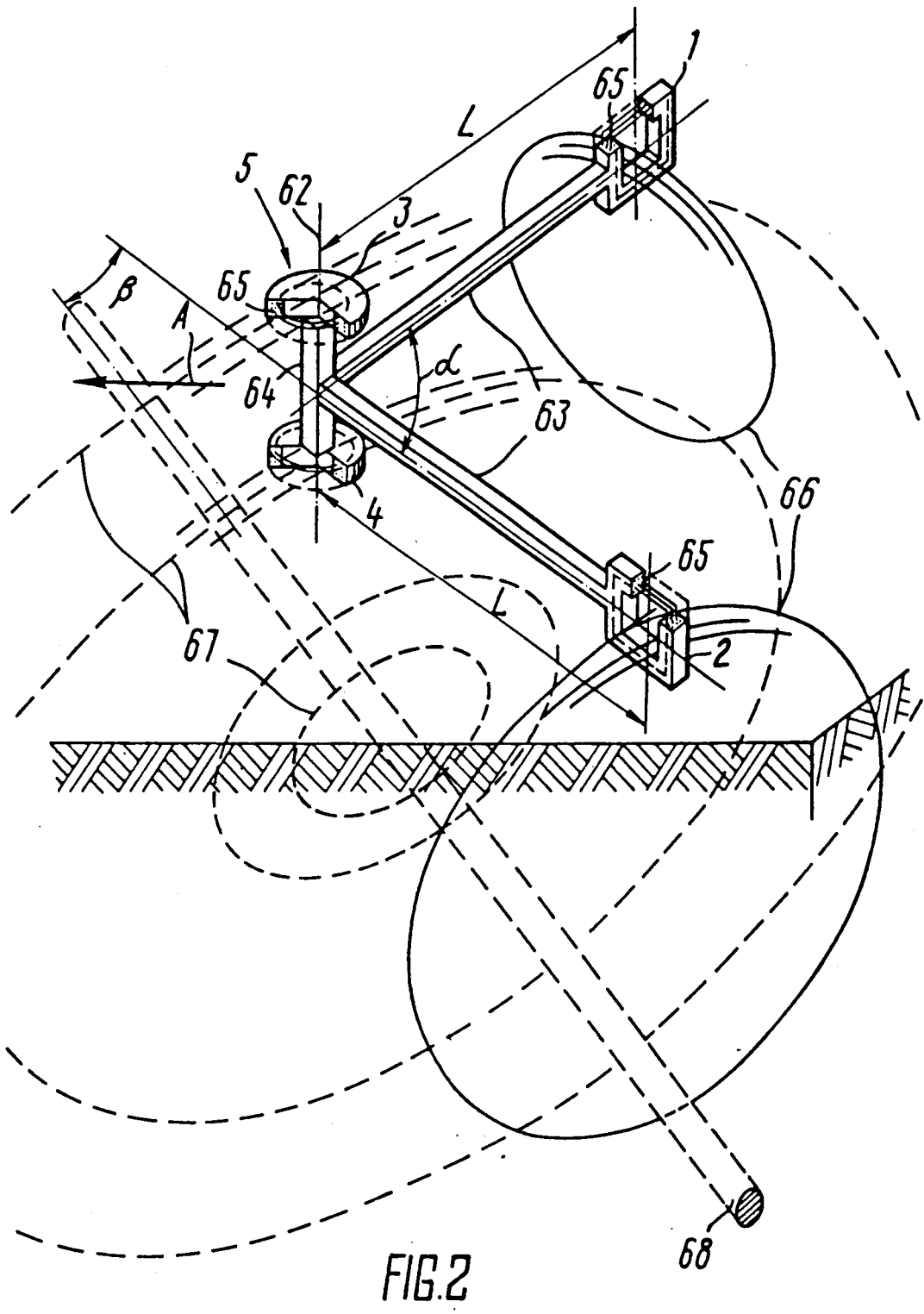
FIG. 2 shows the relative layout of the driving and receiving loops (perspective view), with the original and secondary electromagnetic fields shown schematically and with a partial section along the driving and receiving loops, according to the invention.

Driving and receiving loops 1,2,3,4 are of conductors 65, the turns whereof are schematically shown in FIG. 2, wherein solid lines schematically depict lines of force 66 of the original electromagnetic field induced by driving loops 1,2 in the search site and dashed lines depict lines of force 67 of the secondary electromagnetic field induced by buried metalliferous object 68.

The search direction (direction of movement of induction system 5) is shown by arrow A.

Figure 3:
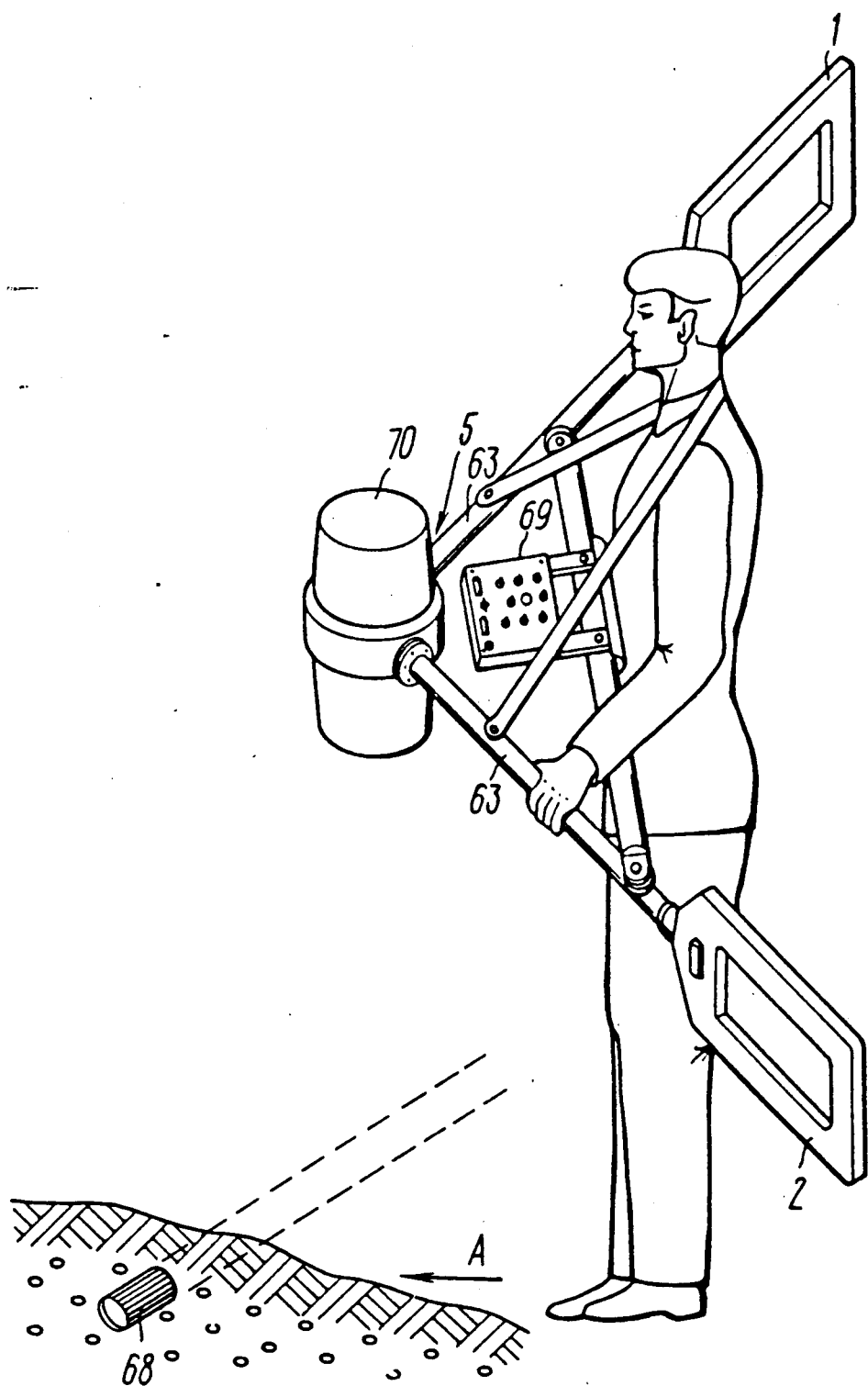
FIG. 3 shows the general view of a portable embodiment of the detector shown in FIG. 1.

Angle α is selected according to the specific applification of the detector. Thus, in case of mounting on a vehicle, to provide vehicle manoeuvrability, driving loops 1,2 are to be positioned at angles approaching or equal to 120°. In case of portable design arrangements (FIG. 3) driving loops 1,2 are to be positioned at angles approaching or equal to 60° and the detector in use is held so as to position driving loops 1,2 to both sides of the operator, with all the electronics, including AC voltage generator 6 (FIG. 1) housed in case 69 directly in front of the operator to provide convenience of reading the readings of recorders 41, 42. Receiving loops 3,4 are housed in body 70 (FIG. 3).

Better understanding of the spirit of the detector of this invention may be obtained by studying the timing diagrams shown in FIG. 4 and illustrating the functioning of switch 19. FIG. 4a shows the time diagram of signals $U_1$ from rectangular pulse generator 56, FIG. 4b shows output signals $U_2$ from time delay circuit 57, FIG. 4c shows control signals $U_3$ arriving at key 31, FIG. 4d shows control signals $U_4$ arriving at key 32, FIGS. 4e, 4f, 4g, 4h show the states of keys 30, 33, 31, 32, wherein position 1 corresponds to an open state and position 0 corresponds to a closed state.

The metalliferous objects detector of the invention functions as follows.

Prior to actual use, to provide high interference immunity and high reliability of metalliferous objects detection, the output signals from receiving loops 3,4 (FIG. 1) are balanced. To this end AC voltage generator 6 is disconnected from driving loops 1,2 and potentiometers 51 in compensators 15, 16 are zeroed, this submitting induction system 5 to the effects of external electromagnetic fields. The source of such extraneous fields may be imitated by a loop similar to the driving loops, connected to AC voltage generator 6, and positioned as symmetrically as possible at a distance equal to thrice the maximum detection depth, as determined by the power of generator 6 and the electromagnetic parameters of induction system 5. Using potentiometers 48,49 and the phase shifter 47 the readings of recorders 41,42 are then set as near to zero as possible.

Balancing is to be performed only if the detector operating conditions are changed. Thus, for instance, if the detector is transfered to another vehicle or if used first as a portable device and subsequently mounted onto a vehicle, or vice versa.

Each time, prior to use, electric signal compensators 15,16 are adjusted to maximal cancelling of signals induced in receiving loops 3,4 by the original electromagnetic field of driving loops 1,2 and incompletely cancelled out by geometric compensation and by the opposite connection of receiving loops 3,4. Adjustments of compensators 15,16 are carried out at a site free of metalliferous objects as follows.

Gradually increasing the output signal of AC voltage generator 6, and adjusting the phase and amplitude with the aid of phase shifter 50 and potentiometer 51, respectively, in compensators 15,16, the readings of recorders 41,42 are set as near to zero as possible. This adjustment is carried out until AC voltage generator is set to its operating power.

The thus adjusted metalliferous objects detector is ready for use. Rectangular pulse generator 56 provides pulses $U_1$ (FIG. 4a) of a $\tau_1$ duration passed to control inputs 35,38 (FIG. 1) of keys 30,33 respectively, and to time delay circuit 57 providing control signals $U_2$ (FIG. 4b) delayed by $\tau_2$. Keys 30, 33 (FIG. 1) periodically, with an interval of $\tau_1$ (FIGS. 4e, 4f), connect driving loops 1,2 (FIG. 1) via outputs 24, 25 and inputs 20, 21 of switch 19 to AC voltage generator 6. Driving loops 1,2 induce an original electromagnetic field in the site under study, this field being of a frequency f and directivity depending on which of the driving loops 1,2 is currently connected to AC voltage generator 6, the connection duration being equal for both loops and set by duration $\tau_1$ (FIGS. 4a, 4b).

At a moment of time $t_1$, switch 19 (FIG. 1) connects, for instance, driving loop 1 to AC voltage generator 6, and at the moment of time $t_2$ (FIG. 4c) the logic AND gate 60 (FIG. 1) is enabled; this gate receives the output signals of rectangular pulse generator 56 and time delay circuit 57 and outputs a logic "1" passed to control input 36 of key 31, opening this latter (FIG. 4g) and thus connecting electric signal compensator 15 to selective amplifier 26 via input 22 and output 28 of switch 19. At the same time electric signal compensator 16 is disconnected from selective amplifier 27, in other words - the first reception channel is set up, comprising electric signal compensator 15, selective amplifier 26, data processor 39, and recorder 41.

At the moment of time $t_3$ (FIG. 4a) keys 30, 31 (FIG. 1) are closed (FIGS. 4e, 4g) under command of the control signal from switch controller 34 (FIG. 1), thus disconnecting driving loop 1 from AC voltage generator 6 and disconnecting selective amplifier 26 from electric signal compensator 15. At the same time key 33 is opened (FIG. 4f) and connects driving loop 2 to AC voltage generator 6 via output 25 and input 21 of switch 19.

At the moment of time $t_4$ (FIG. 4d) logic AND gate 61 is enabled; this gate receives the inverted output signals of rectangular pulse generator 56 and time delay circuit 57 and outputs a logic "1" to control input 37 of key 32 to open this key and connect electric signal compensator 16 to selective amplifier 27 via input 23 and output 29 of switch 19. This establishes the second reception channel, comprising electric signal compensator 16, selective amplifier 27, data processor 40, and recorder 42.

At the moment of time $t_5$ (FIG. 4a) switch 19 disconnects driving loop 2 from AC voltage generator 6 and selective amplifier 27 from compensator 16, at the same time connecting driving loop 1 to AC voltage generator 6. Thereafter the process of signal switching is repeated in the sequence described herein above.

Time interval $\tau_2$ (FIG. 4b) by which time delay circuit 57 delays the pulse train from rectangular pulse generator 56 (FIG. 1) is determined by the duration of transients and should exceed the duration of extinction of the original electromagnetic field generated by driving loop 1 or 2 after its disconnection from AC voltage generator 6.

The first and second reception channels are tuned so, that in the absence of metalliferous objects in their search area the readings of recorders 41, 42 are approximately zero.

The presence of a metalliferous object 68 in the search area (FIG. 2) causes the original electromagnetic field from driving loop 1 or 2, magnetic lines of force 66 whereof intersect metalliferous object 68, to induce currents in this latter and thus generate a secondary electromagnetic field, the magnetic lines of force 67 whereof pierce receiving loops 3,4 of induction system 5. This secondary electromagnetic field induces signals in receiving loops 3,4, the electromotive force whereof is proportional to the distance between each of the receiving loops and metalliferous object 68 and, since this distance is different, a difference signal, proportional to changes in the distance (plan view) from receiving loops 3,4 to metalliferous object 68 (FIG. 2), is generated at the output of electric signal compensator 15 or 16 (FIG. 1) to be passed by switch 19, as described herein above, to the corresponding selective amplifier 26 or 27 and therefrom to the input of corresponding data processor 39 or 40. In data processor 39, 40 the signal is amplified by logarithmic amplifier 53, then detected and passed to negative limiter 55 and from the output of data processor 39 or 40 applied to an input 43 or 44 of logic OR gate 45 and from the output thereof—to signalling unit 46.

Meters of recorders 41, 42 vary their readings in accordance to variations in the distance (plan view) from receiving loops 3, 4 to metalliferous object 68 (FIG. 2) and the signal applied to signalling unit 46 causes it to generate a light and sound signal indicating detection of the metalliferous object.

On the whole, the metalliferous objects detector of this invention provides a high reliability of detection and can be used both for manual operation, as shown in FIG. 3, and mounted on a vehicle. The productivity of search works with this detector is substantially superior to that with other known in the art similar devices, due to scanning the search area during a single pass.

We claim:

1. A metalliferous objects detector, comprising:
   - a first driving loop and a second driving, loop positioned at an angle to one another and generating original electromagnetic fields;
   - a first receiving loop and a second receiving loop picking up the secondary electromagnetic field generated by a metalliferous object, the first and second receiving loops being rigidly connected with the first and the second driving loops and mounted coaxially and parallel to one another, and symmetrically and orthogonally relative to the first and second driving loops, the first and second driving loops being positioned in planes passing through the common axis of the first and second receiving loops;
   - an AC voltage generator having an output connected to the first and second driving loops;
   - a balancer providing balancing of the signals from the first and second receiving loops and having inputs connected to the first and second receiving loops, and an output;
   - a differential amplifier having an input connected to said output balancer providing balancing of signals from the first and second receiving loops, and an output;
   - a first electric signal compensator providing cancelling of signals induced in the first and second receiving loops by the original electromagnetic field of the first driving loop, and having a data input connected to said output of said differential amplifier, a control input, and an output;
   - a second electric signal compensator providing cancelling of signals induced in the first and second receiving loops by the original electromagnetic field of the second driving loop, and having a data input connected to said output of said differential amplifier, a control input, and an output;
   - a first selective amplifier having an input electrically coupled via a switch to said output of the first electric signal compensator, and an output;
   - a second selective amplifier having an input electrically coupled via said switch to said output of the second electric signal compensator, and an output;
   - said switch having a first, second, third and fourth input and a first, second third and fourth output with the first and second inputs connected to said output of said AC voltage generator, with the third and fourth inputs connected to said outputs of the first and second electric signal compensators, the first output connected to the first driving loop and to the control input of the first electric signal compensator, while the second output, to the second driving loop and the control input of the second electric signal compensator;
   - a first data processor having an input connected to said output of the first selective amplifier, and an output;
   - a second data processor having an input connected to said output of the second selective amplifier, and an output;
   - a first recorder connected to said output of the first data processor;
   - a second recorder connected to said output of the second data processor;
   - a logic OR gate having two inputs connected to said outputs of the first and second data processors and an output;
   - a signalling unit connected to said output of said logic OR gate.

2. A metalliferous objects detector as claimed in claim 1, wherein the angle between the first and second driving loops is within the range from 60° to 120°.

3. A metalliferous objects detector as claimed in claim 1, wherein the said switch comprises:
   - a first, second, and third normally closed key, and a fourth normally open key, each having an input, an output and a control input;
   - a switch controller, controlling changing of states of the keys, having a group of outputs connected to appropriate said control inputs of first, second and third normally closed keys and of the fourth normally open key and performing alternate opening of first normally closed key, said input and said output whereof constitute the first input and output of said switch, and of the second normally closed key, said input and said output whereof constitute the third input and output of said switch, and closing of the normally open key, said input and said output whereof constitute the second input and output of said switch, and closing of the third normally closed key, said input and said output whereof constitute the fourth input and output of said switch during one halfcycle, and then closing of the first and third normally closed keys and opening of the third normally closed and the fourth normally open keys during the other halfcycle.

4. A metalliferous objects degector as claimed in claim 3, wherein said switch controller to control the states of the first, second and third normally closed keys and of the fourth normally open key comprises:
   - a rectangular pulse generator having an output, the signals wherefrom are applied to the said control inputs of said first normally closed and fourth normally open keys;
   - a time delay circuit having an input connected to said output of said rectangular pulse generator, and an output;
   - a first inverter having an input connected to said output of said rectangular pulse generator, and an output;
   - a second inverter having an input connected to the said output of said time delay circuit, and an output;
   - a first logic AND gate having a first input connected to said output of said rectangular pulse generator, a second input connected to said output of said time delay circuit, and an output constituting the third output of said switch controller;
   - a second logic AND gate having a first and second inputs connected to said outputs of said inverters, and an output constituting the fourth output of the said switch controller.

* * * * *